(12) United States Patent
Oh et al.

(10) Patent No.: US 12,455,265 B2
(45) Date of Patent: Oct. 28, 2025

(54) HIGH-SPEED SCANNING PHOTO-ACOUSTIC IMAGE INPUT APPARATUS AND CONTROL METHOD THEREFOR

(71) Applicant: PUKYONG NATIONAL UNIVERSITY INDUSTRY-UNIVERSITY COOPERATION FOUNDATION, Busan (KR)

(72) Inventors: Jung Hwan Oh, Busan (KR); Jae Yeop Choi, Busan (KR); Van Tu Nguyen, Busan (KR); Van Hiep Pham, Busan (KR); Nguyen Thanh Phong Truong, Busan (KR); Cao Duon Ly, Busan (KR); Su Min Park, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 368 days.

(21) Appl. No.: 18/266,603

(22) PCT Filed: Jan. 12, 2022

(86) PCT No.: PCT/IB2022/050199
§ 371 (c)(1),
(2) Date: Jun. 12, 2023

(87) PCT Pub. No.: WO2022/149119
PCT Pub. Date: Jul. 14, 2022

(65) Prior Publication Data
US 2024/0044844 A1 Feb. 8, 2024

(30) Foreign Application Priority Data
Jan. 7, 2021 (KR) .......................... 10-2021-0002081

(51) Int. Cl.
*G01N 29/06* (2006.01)
*G01N 29/24* (2006.01)

(52) U.S. Cl.
CPC ..... *G01N 29/0681* (2013.01); *G01N 29/2418* (2013.01); *G01N 29/069* (2013.01); *G01N 2291/02483* (2013.01)

(58) Field of Classification Search
CPC .......... G01N 29/0681; G01N 29/2418; G01N 29/069; G01N 2291/02483
(Continued)

(56) References Cited

U.S. PATENT DOCUMENTS

| 5,078,145 | A | 1/1992 | Furuhata |
| 2017/0100041 | A1* | 4/2017 | Kasamatsu ........ G01N 29/0654 |
| 2017/0296063 | A1* | 10/2017 | Osawa ................... G01N 29/24 |

FOREIGN PATENT DOCUMENTS

| JP | 2002-078710 A | 3/2002 |
| KR | 10-2015-0031874 A | 3/2015 |

(Continued)

*Primary Examiner* — Peter J Macchiarolo
*Assistant Examiner* — Rodney T Frank
(74) *Attorney, Agent, or Firm* — Han's Law Office

(57) ABSTRACT

Disclosed is an apparatus that comprises a photo-acoustic transceiver which outputs, through a laser generator, a laser pulse output toward an object to be examined, and receives, through an ultrasonic wave receiver, an ultrasonic wave image signal from the object to be examined; an analog-to-digital converter which receives the ultrasonic wave image signal and converts same into a digital image signal; a main control unit which receives the digital image signal to generate ultrasonic wave scanning three-dimensional image information about the object to be examined; and a trigger control unit which receives motion information of a photo-acoustic probe to generate a scanning trigger signal corresponding to the motion information, receives laser pulse output information to generate a laser trigger signal corre-
(Continued)

sponding to the laser pulse output, and generates an output trigger signal corresponding to the laser trigger signal and outputs same to the analog-to-digital converter.

18 Claims, 8 Drawing Sheets

(58) Field of Classification Search
USPC .......................................................... 73/607
See application file for complete search history.

(56) References Cited

FOREIGN PATENT DOCUMENTS

| KR | 10-1749602 B1 | 6/2017 |
| KR | 10-2017-0086276 A | 7/2017 |
| KR | 10-1852560 B1 | 4/2018 |
| KR | 10-2036058 B1 | 10/2019 |
| WO | 2004-082482 A1 | 9/2004 |

* cited by examiner

HIGH-SPEED SCANNING PHOTO-ACOUSTIC IMAGE INPUT APPARATUS AND CONTROL METHOD THEREFOR

FIELD OF INVENTION

The present invention relates to an apparatus for acquiring a photoacoustic image by high-speed scanning and a method for controlling the same, and more particularly, to an apparatus for acquiring a photoacoustic image by high-speed scanning capable of generating a 2D or 3D image of an object to be examined while moving a photoacoustic probe at high-speed, and a method for controlling the same.

BACKGROUND OF THE INVENTION

In a case where a certain object is irradiated with light having a very large energy, the object absorbs the light energy and undergoes thermally elastic expansion. In this case, a pressure wave is generated due to the elastic expansion, and the generated pressure wave is a kind of an ultrasonic wave. This phenomenon is called a "photoacoustic effect", and an ultrasound signal generated due to this expansion is called a photoacoustic signal.

Recently, a technique for acquiring state information of an object, in particular, the inside of the object using the photoacoustic effect to generate image information has been in the spotlight, and in particular, various researches on the technique have been made in a medical field. In the medical field, there are cases in which it is necessary to visually check state information of the inside of a living body during a treatment process of a disease. Currently, as a well-known tool, X-ray, CT, MRI, or the like has been widely used as a method of generating image information of the inside of a living body. However, these methods have some problems in that the cost is high, the resolution of a generated image is very low, the field of view (FOV) is narrow, time required to form the image is long, or it can be harmful to a human body due to continuous use, for example. Accordingly, a technique of generating image information (photoacoustic image) on an internal state of a living body using the photoacoustic effect is attracting attention as an alternative to the above-mentioned methods.

However, in order to effectively use the technique of generating internal state information of the living body as image information in a medical treatment process, it is necessary to perform high-speed scanning and reduce time required to form an image to acquire the internal state information of the living body in real time. In addition, it is necessary to generate a high-resolution image by acquiring a high signal-to-noise ratio (SNR) and a sufficient field of view (FOV).

SUMMARY OF THE INVENTION

An object of the present invention is to provide an apparatus for acquiring a photoacoustic image by high-speed scanning and a method for controlling the same, capable of receiving an ultrasound image of an object while moving a photoacoustic probe at high speed and converting the ultrasound signal into a 2D or 3D image, thereby generating a high-resolution 2D or 3D image of the object at high speed.

According to an aspect of the present invention, there is provided an apparatus for acquiring a photoacoustic image by high-speed scanning, that converts a one-directional rotational motion of a drive motor into a linear reciprocating motion of a photoacoustic probe connected to the drive motor and generates an image of an object by scanning the object in two dimensions by the linear motion of the photoacoustic probe and a vertical motion perpendicular to the linear motion, including: a photoacoustic transmitter/receiver that outputs a laser pulse toward the object using a laser generating section and receives an ultrasound image signal from the object using an ultrasound receiver; an analog-to-digital converter that receives the ultrasound image signal and converts the ultrasound image signal into a digital image signal; a main controller that receives the digital image signal and generates ultrasound image information on the object; and a trigger controller that receives motion information of the photoacoustic probe, generates a scanning trigger signal corresponding to the motion information, receives information of the laser pulse output, generates a laser trigger signal corresponding to the laser pulse output, generates an output trigger signal corresponding to the laser trigger signal, and outputs the generated output trigger signal to the analog-to-digital converter, in which the main controller sequentially synthesizes images corresponding to the ultrasound image signals corresponding to the output trigger signals in the unit of a scan line to generate an image of the object.

The analog-to-digital converter may convert the ultrasound image signal corresponding to the output trigger signal in the ultrasound image signal input from the ultrasound receiver into a digital image signal, and may transmit the digital image signal to the main controller.

The main controller may sequentially synthesize the input digital image signals in the unit of a scan line to generate a line image, and may synthesize the line images in the respective scan lines to generate a 3D image.

Even-numbered line images may be synthesized in a reverse order to generate an even-numbered image, and the even-numbered image may be synthesized with an odd-numbered image to generate a 3D image.

The one-directional rotational motion of the drive motor may be converted into the linear reciprocating motion of the photoacoustic probe by a slider-crank mechanism, a pair of the photoacoustic probes may be installed on a slider to be spaced from each other in the same direction as a rail extending direction, and the pair of photoacoustic probes may be installed to be spaced from each other by the same distance corresponding to twice a rotation radius of a crank shaft with reference to the slider.

The one-directional rotational motion of the drive motor may be converted into the linear reciprocating motion of the photoacoustic probe by a slider-crank mechanism, a pair of the photoacoustic probes may be installed in a slider to be spaced from each other in the same direction as a rail extending direction, and the pair of photoacoustic probes may be installed to be spaced from each other by the same distance shorter than twice a rotation radius of a crank shaft with reference to the slider.

The apparatus may further include a beam splitter that splits a laser beam generated in the laser generating section into a first laser beam and a fourth laser beam; a photo detector that detects the fourth laser beam and generates a laser detection signal; and a coupler that reflects the first laser beam to irradiate the object with the reflected first laser beam, and transmits the ultrasound signal from the object, in which the ultrasound receiver receives the ultrasound image signal that has passed through the coupler.

The apparatus may further include a first beam splitter that splits a laser beam generated in the laser generating section into a first laser beam and a second laser beam; a second beam splitter that splits the second laser beam into a third laser beam and a fourth laser beam; a photo detector that detects the fourth laser beam and generates a laser detection signal; a first coupler that reflects the first laser beam to irradiate a portion of the object with the reflected first laser beam, and transmits the ultrasound signal from the object; and a second coupler that reflects the third laser beam to irradiate another portion spaced from the portion of the object by a predetermined distance with the reflected third laser beam, and transmits the ultrasound signal from the object, in which the ultrasound receiver receives the ultrasound image signals that have passed through the first and second couplers.

The coupler may include a coupling surface on which two prisms are coupled, and the coupling surface may be coated with an aluminum material to reflect the irradiated laser beam and transmit the ultrasound image signal.

An image generating section of the main controller may calculate a position of the photoacoustic probe corresponding to the output trigger signal, and may store the ultrasound image signal at the calculated position in correspondence with each output trigger signal.

The motion information of the photoacoustic probe may be rotational motion information of a rotary encoder that detects the rotational motion of the drive motor, and the rotary encoder may be an incremental rotary encoder that outputs an A-phase signal, a B-phase signal, and a Z-phase signal.

The scanning trigger signal may be generated on the basis of rotational position information by an A-phase signal of an incremental rotary encoder that detects the rotational motion of the drive motor, a linear motion position of the photoacoustic probe may be calculated when each output trigger signal is calculated, and the ultrasound image signal at the calculated linear motion position may be stored in correspondence to each output trigger signal.

The scanning trigger signal may be generated on the basis of a linear motion position of the probe calculated by a linear encoder pulse signal generated by a linear encoder that detects the linear motion of the photoacoustic probe, and the ultrasound image signal at the linear motion position of the probe may be stored in correspondence to each output trigger signal.

The motion information of the photoacoustic probe may include rotational motion information of a rotary encoder that detects the rotational motion of the drive motor and linear motion information of a linear encoder that detects the linear motion of the photoacoustic probe, the rotary encoder may be an incremental rotary encoder that outputs an A-phase signal, a B-phase signal, and a Z-phase signal in the form of pulses, respectively, and the linear encoder may output a linear pulse signal at regular intervals in the form of pulses according to a position on a linear motion trajectory of the photoacoustic probe.

In a case where the one-directional rotational motion of the drive motor is started, the trigger controller may generate a first trigger event signal after the A-phase signals of a preset number (Z1) of pulses is input after the Z-phase signal of the rotary encoder is generated, and in a case where the first trigger event signal is generated, the scanning trigger signal may be generated in the form of pulses up to a preset position of the photoacoustic probe using the pulse signal of the linear encoder as a synchronization signal.

The scanning trigger signal may be generated at an interval of an integer multiple of an interval of the pulse signal of the linear encoder.

The trigger controller may generate a second trigger event signal in correspondence to a preset position of the photoacoustic probe after the generation of the scanning trigger signal is stopped, and in a case where the second trigger event signal is generated, the scanning trigger signal may be generated in the form of pulses up to a preset position of the photoacoustic probe using the pulse signal of the linear encoder as a synchronization signal.

The apparatus may further include: a target area input section that performs input of an image of a target area including the object; and a scan area extracting section that extracts a scan area determined by position values corresponding to a starting point and an end point of an area in which a photoacoustic image of the object is acquired from the image of the target area.

According to another aspect of the present invention, there is provided a method for controlling the apparatus for acquiring the photoacoustic image by high-speed scanning.

According to the present invention, it is possible to generate high-resolution 2D or 3D image information of an object by receiving a photoacoustic signal in real time while moving a photoacoustic probe at high speed to convert the photoacoustic signal into a 2D or 3D image.

Further, by acquiring the photoacoustic image signal of the object using a slider-crank mechanism, it is possible to perform high-speed scanning of the object.

Further, it is possible to enlarge a field of view (FOV) by including a 2-channel photoacoustic probe, and thus, it is possible to quickly acquire an image of an inspection area in a wider range including an object.

In addition, in a case where the slider-crank mechanism is utilized, by using, as a virtual reference point pulse signal, a pulse signal input after pulse signals of a predetermined number are input after an actual reference point pulse signal of an encoder is input, it is possible to prevent a problem caused in a case where the actual reference point pulse signal is not stably implemented, thereby generating an accurate image of the object.

That is, since start of a scanning operation by the actual reference point pulse signal (for example, a Z-phase pulse signal) and start of acquisition of a photoacoustic signal (image information acquisition) by the virtual reference point pulse signal are performed with a time difference, it is possible to obtain accurate high-resolution image information from which noise or the like is eliminated.

Further, by generating a scanning trigger signal at a set encoder pulse signal interval, generating an output trigger signal accordingly, and converting an ultrasound image signal input according to the output trigger signal into an image signal of the object, it is possible to accurately match set position information with image information according to the position information, thereby generating accurate image information of the object.

DESCRIPTION OF THE PREFERRED EMBODIMENTS

Figure 1:
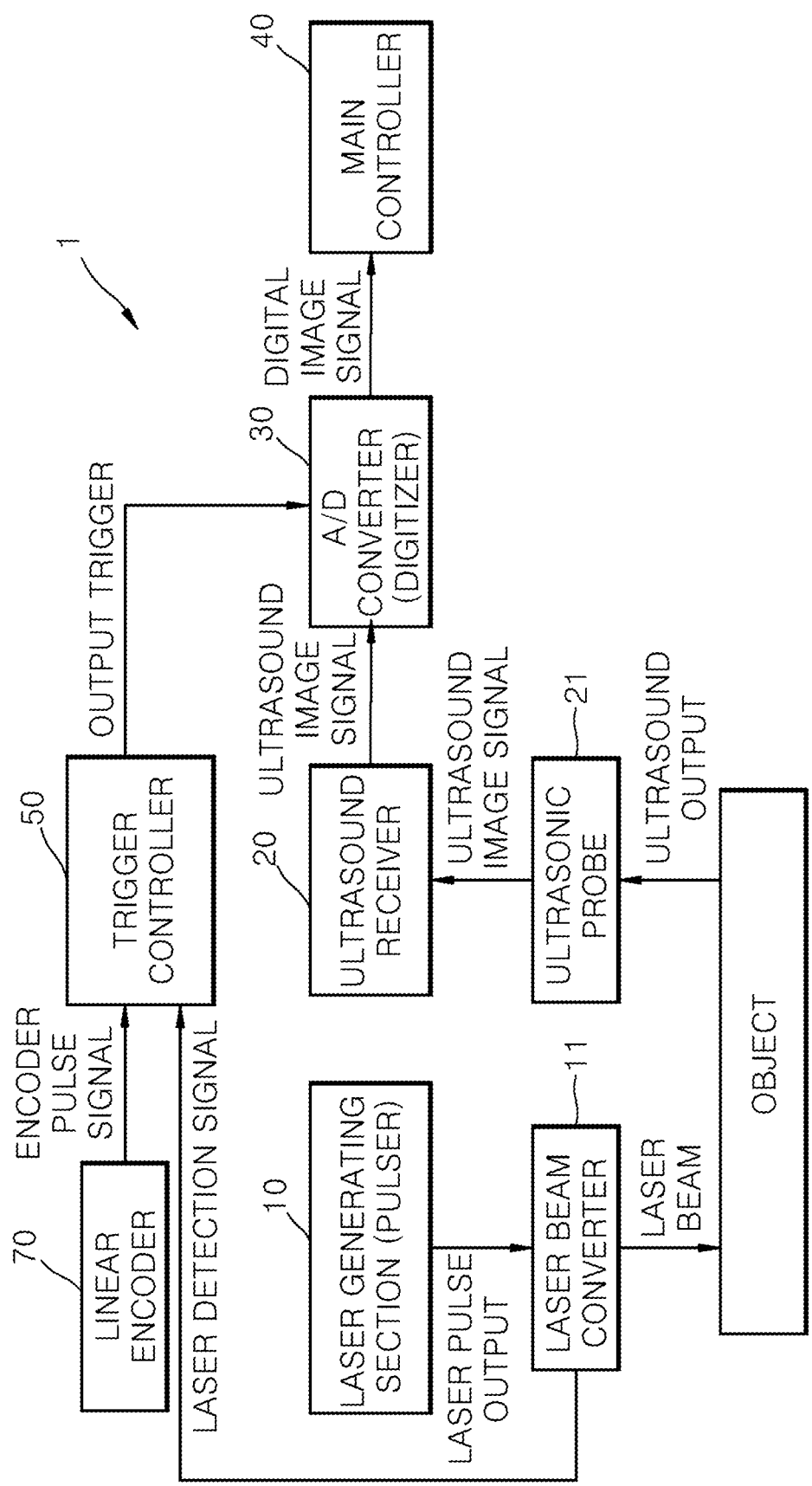
FIG. 1 is a block diagram schematically showing a high-speed scanning photoacoustic image acquiring apparatus according to an embodiment of the present invention.

Hereinafter, preferred embodiments of the present invention will be described in detail with reference to the accompanying drawings. In the drawings, the same reference numbers are given to the same components, and repetitive description will be omitted as necessary. In addition, known functions or configurations related to the present invention will be simplified or omitted.

Further, terms used in the present specification are selected as widely used general terms as possible in consideration of functions in the present invention, which may vary depending on an intention of a person skilled in the art, precedents, emergence of new technologies, or the like. In addition, in certain cases, there are also terms arbitrarily selected by the inventors, and in this case, the meaning thereof will be described in detail in corresponding description of the invention. Therefore, the terms used in this specification should be defined on the basis of the meanings of the terms and the overall content of the present invention.

In the present specification, in a case where a certain section "includes" a certain component, it means that other components may be further included, unless otherwise stated. Further, the term "section" as used herein means not only a hardware configuration such as an FPGA or an ASIC, but also a software configuration. Further, the "section" is not limited to software or hardware. The "section" may be provided on an addressable storage medium, or may be configured to reproduce one or more processors. Accordingly, as examples, the "section" may include components such as software components, object-oriented software components, class components and task components, and may include processes, functions, properties, procedures, subroutines, segments of program codes, drivers, firmware, microcodes, circuitry, data, databases, data structures, tables, arrays and variables. Functions provided within the components and "sections" may be combined into a smaller number of components and "sections", or may be further divided into additional components and "sections".

A method of generating a photoacoustic image of an object, particularly the inside of a living body, using a photoacoustic effect is as follows. First, an optical beam (for example, a laser beam) is irradiated to a specific part of a living body for which a 3D image is to be acquired, a photoacoustic signal generated according to thermal elastic expansion generated in the specific part by the irradiated beam (ultrasound signal) is acquired through an ultrasonic probe (ultrasonic transducer), and the acquired photoacoustic signal is processed to generate image information about the inside of the living body.

An apparatus for acquiring a photoacoustic image by high-speed scanning according to an embodiment of the present invention may include a photoacoustic microscopy (PAM). Further, a photoacoustic probe of the photoacoustic microscopy (PAM) may scan a target area including an object while being moved at high-speed using a slider-crank mechanism. The high-speed scanning photoacoustic image input apparatus may convert a one-directional rotational motion of a drive motor into a linear reciprocating motion of the photoacoustic probe connected to the drive motor. In addition, the high-speed scanning photoacoustic image input apparatus may scan the object in two dimensions by the linear motion of the photoacoustic probe and a vertical motion perpendicular to the linear motion to generate a 3D image of the object.

The photoacoustic microscopy (PAM) may be an optical-resolution photoacoustic microscopy (OR-PAM) having a spatial resolution of a micron scale by focusing an optical beam (for example, laser beam). The optical-resolution photoacoustic microscopy may use an optical focus of a high resolution.

On the other hand, the photoacoustic microscopy (PAM) may be an acoustic-resolution photoacoustic microscopy (AR-PAM) that uses an acoustic focus of a resolution lower than that of the optical-resolution photoacoustic microscopy (OR-PAM).

Since the optical-resolution photoacoustic microscopy (OR-PAM) depends on the optical beam having a higher resolution than that of the acoustic beam, it is possible to obtain an image of a higher resolution compared with that of the acoustic-resolution photoacoustic microscopy (AR-PAM). Further, since the optical-resolution photoacoustic microscopy (OR-PAM) has a rich optical absorption contrast, it may be an important imaging tool in many fields, for example, fields related to medicine, such as biology, dermatology, neurology, oncology, ophthalmology and pathology.

The optical-resolution photoacoustic microscopy (OR-PAM) may employ a confocal configuration and a coaxial configuration of an optical excitation beam and an acoustic detection beam to maximize a signal-to-noise ratio (SNR) and optimize a spatial resolution. Volumetric imaging is typically performed by point-by-point raster scanning of optical and acoustic beams, to which a stepping motor scanning stage may be applied.

Due to a scanning step size required by a lateral resolution of a micron level, a scanning speed (imaging speed) and a scanning range of the optical-resolution photoacoustic microscopy (OR-PAM) may become low (a B-scan rate of about 1 [Hz] in a scanning range of 1 [mm]). Due to the low imaging speed, it is not easy to obtain tissue's dynamic information such as transient drug response and skin vasculature by the optical-resolution photoacoustic microscopy (OR-PAM).

On the other hand, there may be various methods for improving a field of view (FOV) corresponding to a scanning range of the optical-resolution photoacoustic microscopy (OR-PAM), increasing the scanning speed or shortening the scanning time, and maintaining a high signal-to-noise ratio (SNR). In order to implement the optical-resolution photoacoustic microscopy (OR-PAM), a trade-off having these three characteristics is necessary. However, such a trade-off may function as a factor that makes it difficult to implement the optical-resolution photoacoustic microscopy (OR-PAM) that satisfies the three characteristics. This is because the scanning time depends on a pulse repetition rate of laser and a scanning mechanism, and is also limited by a sound speed of a photoacoustic wave (PA wave) in tissues.

In order to reduce the scanning time (to improve the scanning speed) in the optical-resolution photoacoustic microscopy (OR-PAM), various approaches such as a galvanometer scanner, a microelectromechanical system (MEMS) scanner, a hexagon-mirror scanner or a voice-coil scanner may be used. However, although these techniques have their own advantages, there is a limitation in not providing the maximum or optimal scanning speed.

The apparatus for acquiring a photoacoustic image by high-speed scanning according to the embodiment of the present invention may include a high-speed optical-resolution photoacoustic microscopy (OR-PAM) using a slider-crank mechanism with 2 channels. Here, the 2 channels may be used to double the field of view (FOV).

Figure 2:
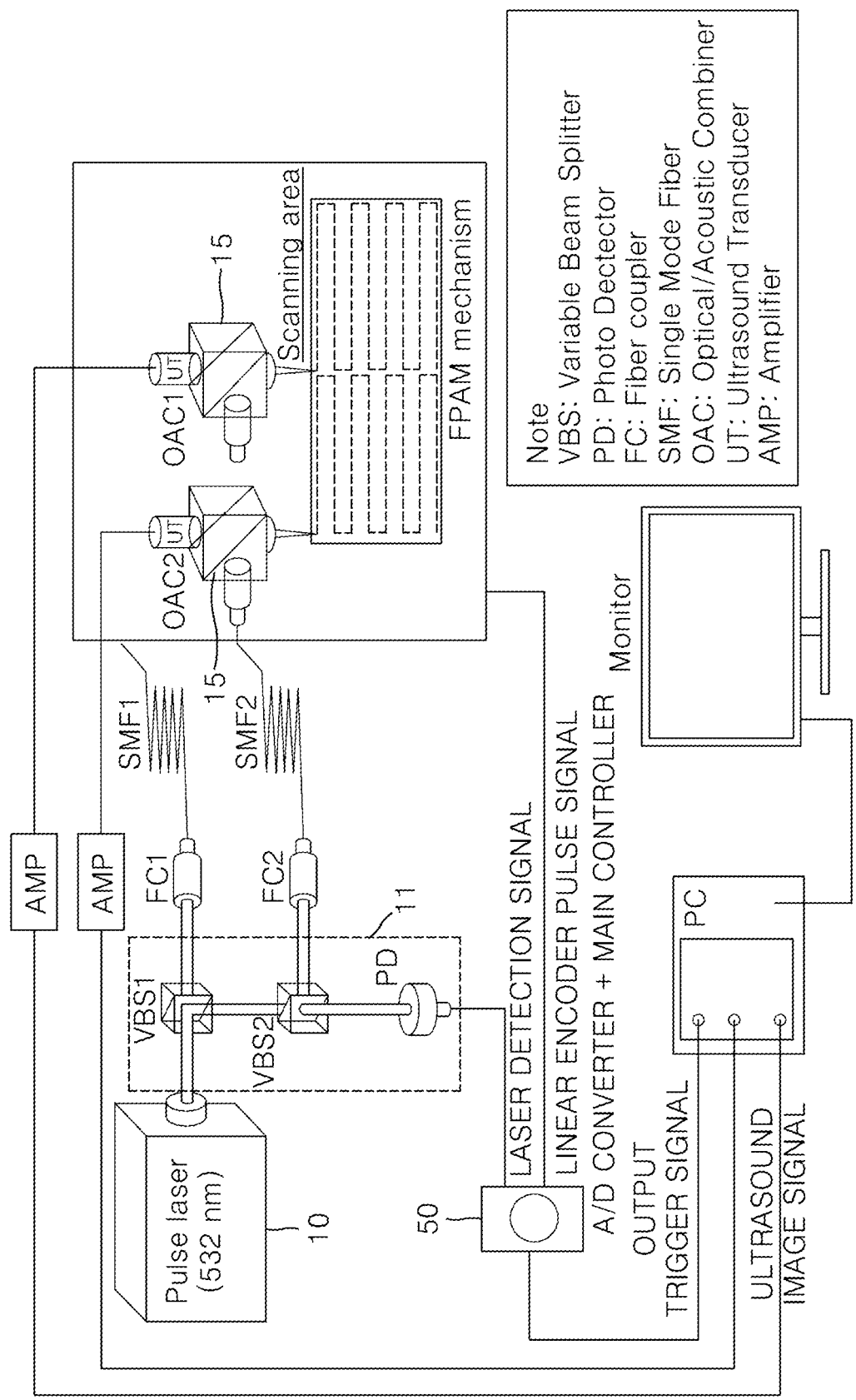
FIG. 2 is a diagram more specifically showing the high-speed scanning photoacoustic image acquiring apparatus of FIG. 1, which schematically shows an embodiment of a 2-channel high-speed scanning photoacoustic image acquiring apparatus.

FIG. 1 is a block diagram of an apparatus 1 for acquiring a photoacoustic image by high-speed scanning according to an embodiment of the present invention, and FIG. 2 shows the apparatus 1 in FIG. 1 in more detail.

Figure 6:
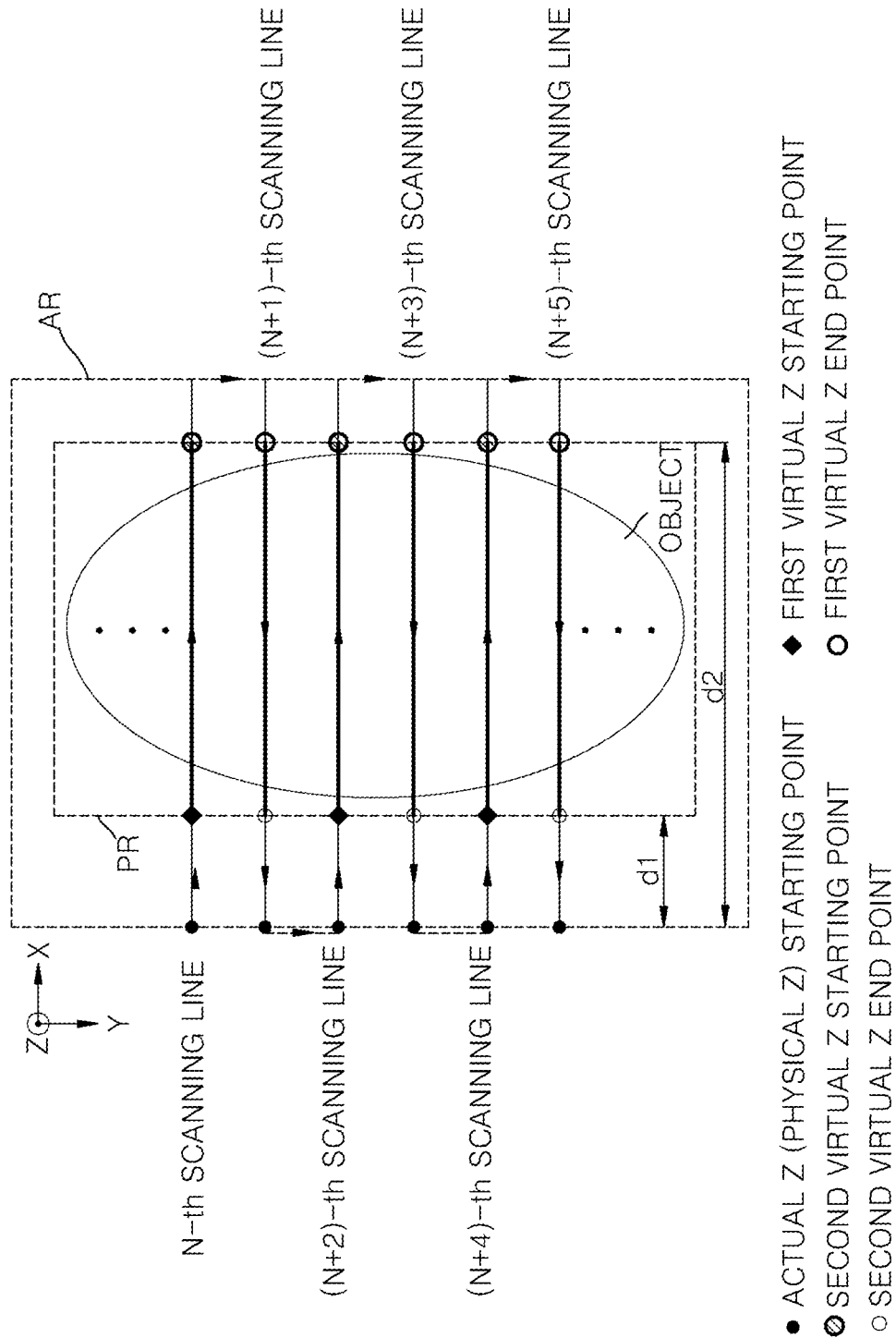
FIG. 6 is a diagram schematically showing a process of scanning an object according to the slider-crank mechanism in the high-speed scanning photoacoustic image acquiring apparatus of FIG. 1.

Referring to the drawings, the apparatus 1 may convert a one-directional rotational motion of a drive motor into a linear reciprocating motion of a photoacoustic probe 15 connected to the drive motor, for example, a linear reciprocating motion in a +X and −X direction in FIG. 6, and may generate a 3D image of an object by scanning the object in two dimensions by the linear motion of the photoacoustic probe 15 and a vertical motion perpendicular to the linear motion in a Y direction in FIG. 6.

The apparatus 1 may include a photoacoustic transmitter/receiver 10 and 20, an analog-to-digital converter 30, a main controller 40, and a trigger controller 50.

The photoacoustic transmitter/receiver 10 and 20 may output a laser pulse generated from a laser generating section 10 toward an object through the photoacoustic probe 15, and may receive an ultrasound image signal from the object using an ultrasound receiver 20. The photoacoustic transmitter/receiver 10 and 20 may include the laser generating section 10 that generates a laser beam and the ultrasound an ultrasound receiver 20 that receives an ultrasound signal, and may include a laser beam converter 11 that divides the laser beam and converts its path, the photoacoustic probe 15, and an ultrasonic probe 21 that receives the ultrasound signal. Here, the ultrasound receiver 20 may include an amplifier (AMP) shown in FIG. 2, and may include the ultrasonic probe 21 and the amplifier (AMP) according to points of view.

The analog-to-digital converter 30 may receive an ultrasound image signal and may convert the ultrasound image signal into a digital image signal. The main controller 40 may include an image information generating section that receives the digital image signal and generates ultrasound scan 3D image information on the object. The main controller 40 may display 3D image information on a monitor, may perform input and/or output of various signals by communicating with the inside and/or outside thereof, and may control various components included in the apparatus 1.

The trigger controller 50 may receive motion information (encoder pulse signal) of the photoacoustic probe 15, may generate a scanning trigger signal corresponding to the motion information, may receive laser pulse output information (laser detection signal), may generate a laser trigger signal corresponding to the laser pulse output, may generate an output trigger signal corresponding to the laser trigger signal, and may output the result to the analog-to-digital converter 30.

Here, the main controller 40 may synthesize images corresponding to the ultrasound image signals corresponding to the output trigger signals in the unit of a scan line to generate an image of the object.

That is, the apparatus 1 may basically include the photoacoustic transmitter/receiver 10 and 20, the analog-to-digital converter 30, and the main controller 40 in order to capture a photoacoustic image by a laser pulse output and an ultrasound image signal, and may further include the trigger controller 50 independently of these components. Accordingly, it is possible to obtain an image of an object in nearly real time by performing two-dimensional scanning on a target area by simple configuration and control, and to generate a 3D ultrasound image at high-speed with a wide field of view (FOV).

The analog-to-digital converter 30 may convert an ultrasound image signal (A scan image) corresponding to an output trigger signal in an ultrasound image signal input from the ultrasound receiver 20 of the photoacoustic transmitter/receiver 10 and 20 into a digital image signal to transmit the digital image signal to the main controller 40. Further, the main controller 40 may sequentially synthesize the input digital image signals in the unit of a scan line to generate a line image (B scan image), and may synthesize the line images in the respective scan lines to generate a 3D image (C scan image). Even-numbered line images may be synthesized in a reverse order to generate an even-numbered image, and the even-numbered image may be synthesized with an odd-numbered image to generate a 3D image.

Here, the trigger controller 50 receives a laser detection signal input from the photoacoustic transmitter/receiver 10 and 20 and a rotary encoder pulse signal and/or a linear encoder pulse signal to generate a scanning trigger signal and a laser trigger signal, respectively, and generates and outputs an output trigger signal synchronized with the laser trigger signal that follows the scanning trigger signal. The analog-to-digital converter 30 receives the output trigger signal from the trigger controller 50, and converts the ultrasound image signal (A scan signal) corresponding to the output trigger signal in the ultrasound image signal input from the ultrasound receiver 20 of the photoacoustic transmitter/receiver 10 and 20 and transmits the result to the image generating section. The image generating section sequentially synthesizes the input digital image signals in the unit of a scan line to generate a line image (B scan signal), and synthesizes the line images in the respective scan lines to generate a 3D image (C scan signal).

Here, the even-numbered line images may be synthesized in the reverse order to generate the even-numbered image, and the even-numbered image may be synthesized with the odd-numbered image (C scan signal) to generate the 3D image. At this time, since one rotation of the drive motor is converted into a linear reciprocating motion of the photoacoustic probe 15, two scan lines can be covered with one rotation of the motor, thereby making it possible to increase the scanning speed. Further, in this case, it is possible to generate an accurate 3D image (C scan signal) by synthesizing images of even-numbered lines and images of odd-numbered lines in the reverse order.

With this configuration, it is possible to perform high-speed scanning with a wide field of view (FOV) with respect to an object using a slider-crank mechanism, and to accurately synthesize high-speed scan images.

To this end, the apparatus 1 according to the embodiment of the present invention may further include a beam splitter (VBS), a photo detector (PD), and a coupler (OAC). The beam splitter (VBS) splits a laser beam generated in the laser generating section 10 into a first laser beam and a fourth laser beam. In this case, the beam splitter (VBS) may be a variable beam splitter capable of adjusting the amount and/or size of each laser beam to be divided.

The photo detector PD may detect the fourth laser beam to generate a laser detection signal as a pulse signal. The coupler (OAC) may combine an optical signal and an acoustic signal in order to reflect the first laser beam to irradiate the object with the reflected first laser beam and transmit the ultrasound signal generated in the object. The ultrasound receiver (UT) 20 may receive the ultrasound image signal that has passed through the coupler (OAC).

The present embodiment relates to an apparatus for acquiring a photoacoustic image by high-speed scanning with one channel including one photoacoustic probe 15, in which most of the laser beam output from one laser generating section 10 is transmitted to the photoacoustic probe 15 through the beam splitter (VBS), and a laser beam having a relatively very small amount is transmitted to the photo detector (PD). In this case, referring to FIGS. 2 and 5, the photo detector (PD) may detect the transmission of the laser beam to the photoacoustic probe 15 and may transmit the laser detection signal to the trigger controller 50. Here, the trigger controller 50 may generate a scanning trigger signal from the rotary encoder pulse signal and/or linear encoder pulse signal, may generate a laser trigger signal in response to a laser detection signal following the scanning trigger signal, may generate an output trigger signal synchronized with the laser trigger signal, and may transmit the result to the analog-to-digital converter 30.

Accordingly, the analog-to-digital converter 30 receives the output trigger signal and the ultrasound image signal and stores the ultrasound image signal corresponding to the output trigger signal as an ultrasound image signal corresponding to the rotary encoder position and/or the linear encoder position that are sequentially designated, thereby synthesizing accurate an image corresponding to the object in the unit of each scan line. That is, it is possible to acquire the ultrasound image signal corresponding to the sequentially designated rotary encoder position and/or linear encoder position.

To this end, the image generating section of the main controller 40 may calculate a position of the photoacoustic probe 15 corresponding to the output trigger signal, and may store the ultrasound image signal at the calculated position in correspondence with each output trigger signal.

As another embodiment of the present invention, the apparatus 1 as shown in FIG. 2 may further include a first beam splitter (VBS1), a second beam splitter (VBS2), a photo detector (PD), a first coupler (OAC1), and a second coupler (OAC2). The present embodiment relates to an apparatus for acquiring a photoacoustic image by high-speed scanning, of a two-channel type including two photoacoustic probes 15, and thus, it is possible to substantially double the field of view (FOV).

That is, most of a laser beam output from one laser generating section 10 is divided into two main laser beams and one signal laser beam through the beam splitters (VBS1 and VBS2) to form two main laser beams, respectively, and the two main laser beams are transmitted to the photoacoustic probes 15 through the first coupler (OAC1) and the second coupler (OAC2), respectively. In addition, a signal laser beam having a relatively very small amount is transmitted to the photo detector (PD).

The laser generating section 10 generates a laser beam. The first beam splitter (VBS1) splits the laser beam generated in the laser generating section into a first laser beam and a second laser beam. The second beam splitter (VBS2) splits the second laser beam into a third laser beam and a fourth laser beam. In this case, the beam splitter (VBS) may be a variable beam splitter capable of adjusting the amount and/or size of each laser beam to be divided.

The photo detector (PD) may detect the fourth laser beam to generate a laser detection signal as a pulse signal.

The first coupler (OAC1) may combine an optical signal and an acoustic signal in order to reflect the first laser beam to irradiate the object with the reflected first laser beam and transmit the ultrasound signal generated in the object. The second coupler (OAC2) combines an optical signal and an acoustic signal to reflect the third laser beam to irradiate a portion of the object with the reflected third laser beam and transmit the ultrasound signal from the object. Here, another portion (a different area) spaced from a portion of the object, irradiated with the first laser beam, by a predetermined distance is irradiated with the reflected third laser beam, to thereby obtain an image signal in the different area.

The ultrasound receiver (UT) 20 may receive ultrasound image signals that have passed through the couplers (OAC1 and OAC2) at positions spaced from each other by a predetermined distance in the object.

In this case, the photo detector (PD) may detect transmission of the laser beams to the photoacoustic probes 15 and may transmit laser detection signals to the trigger controller 50. Here, the trigger controller 50 may generate a scanning trigger signal from a rotary pulse signal and/or a linear pulse signal, may generate a laser trigger signal in correspondence with a laser detection signal that follows the scanning trigger signal, may generate an output trigger signal synchronized with the laser trigger signal, and may transmit the result to the analog-to-digital converter 30.

Accordingly, the analog-to-digital converter 30 receives the output trigger signal and the ultrasound image signal, and stores the ultrasound image signal corresponding to the output trigger signal as the ultrasound image signal corresponding to the sequentially designated rotary and/or linear encoder position, thereby synthesizing an accurate image corresponding to the object in the unit of each scan line. That is, it is possible to acquire ultrasound image signals corresponding to the sequentially designated rotary and/or linear encoder position.

To this end, the image generating section of the main controller 40 may calculate the position of the photoacoustic probe 15 corresponding to the output trigger signal, and may store the ultrasound image signal at the calculated position in correspondence with each output trigger signal.

Here, the position corresponding to one rotary and/or one linear encoder position may include two positions spaced from each other by a predetermined distance between the pair of photoacoustic probes 15, and may correspond to a pair of input ultrasound image signals, respectively.

The first beam splitter (VBS1) may receive the laser beam generated in the laser generating section 10 and may split the laser beam into the first laser beam and the second laser beam. In this case, the transmission of the laser beam generated in the laser generating section 10 to the first beam splitter (VBS1) may be performed through a lens or a mirror through a free space from the laser generating section 10 or through an optical fiber. Here, the laser beam is generated in the form of pulses, and in this case, a pulse repetition rate is adjustable (or tunable).

The first laser beam and the third laser beam may be respectively transmitted to the photoacoustic probes 15 to be output to the object. Accordingly, the ultrasound signals returned from the object may be input to the analog-to-digital converter 30 through the photoacoustic probes 15, respectively. In this case, the photoacoustic probes 15 may include the couplers (OAC1 and OAC2) and the ultrasonic receivers UT. Each of the couplers (OAC1 and OAC2) combines an optical signal of the laser beam output toward the object and an acoustic signal of the ultrasound signal returned from the object. Here, each of the couplers (OAC1 and OAC2) performs combining so that an optical signal and an acoustic signal partially overlap and pass through one member.

Each of the couplers (OAC1 and OAC2) reflects the laser beam to irradiate the object with the reflected laser beam. In this case, focusing may be performed through a convex lens, but may be performed through an aspherical lens for accurate focusing. An ultrasound signal generated by thermal elastic expansion of the object by the laser beam reflected by each of the couplers (OAC1 and OAC2) goes through the couplers (OAC1 and OAC2), and the ultrasound receiver (UT) receives the ultrasound signal passed through each of the couplers (OAC1 and OAC2). On the other hand, the couplers (OAC1 and OAC2) include a coupling surface on which two prisms are coupled, and the coupling surface is coated with an aluminum material to reflect the irradiated laser beam and transmit the ultrasound signal.

Further, in order to improve the ultrasonic reception performance in the ultrasound receiver (UT), the ultrasound signal passed through each of the couplers (OAC1 and OAC2) may be received by the ultrasound receiver (UT) through an acoustic lens, and the ultrasound receiver (UT) may be provided in an ultrasonic probe that is positioned to be spaced in a vertical direction of an XY-plane on which the object is located and performs a zigzag motion in the XY directions.

Image information about the object may be generated through a scanning process of an inspection area including the object. Here, a rotational motion of the drive motor may be converted into a linear reciprocating motion of the photoacoustic probe 15 by the slider-crank mechanism.

Figure 3:
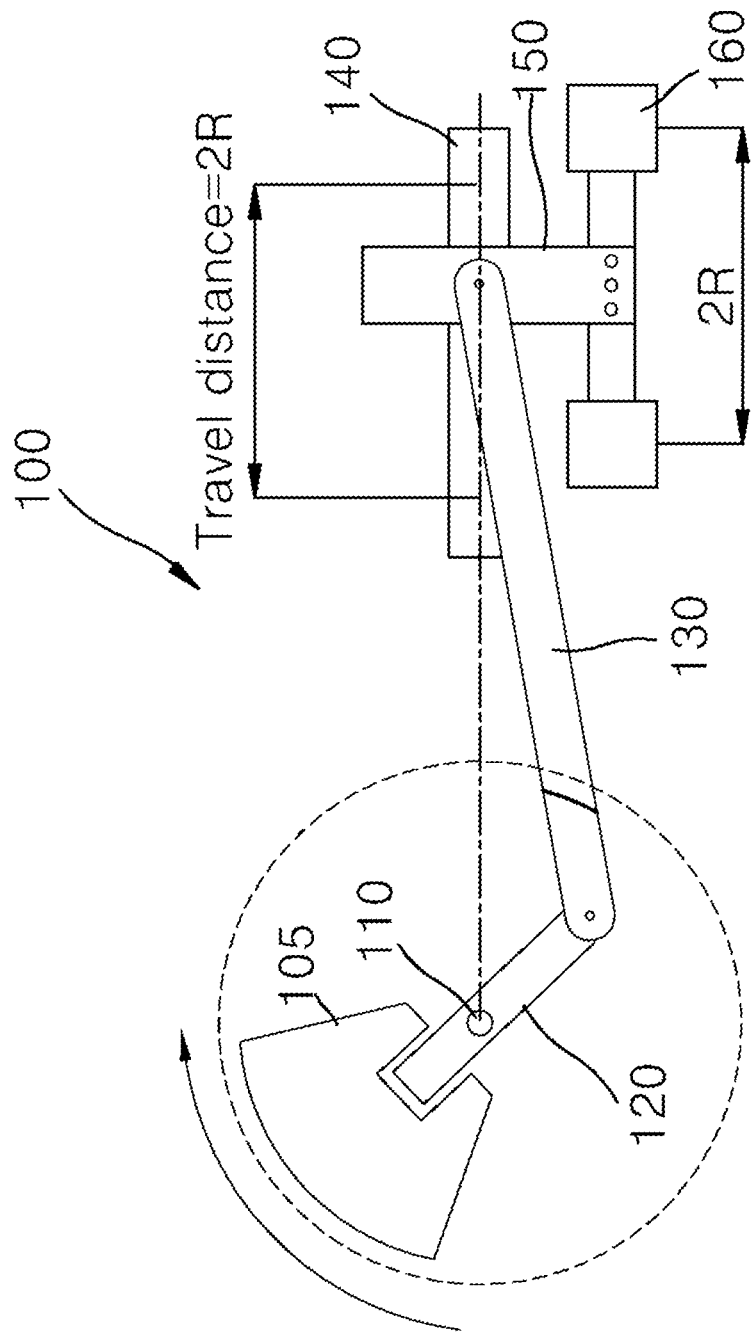
FIG. 3 is a diagram schematically showing a linear reciprocating motion of a driving unit of a 2-channel photoacoustic probe of the high-speed scanning photoacoustic image acquiring apparatus of FIG. 2.
Figure 4:
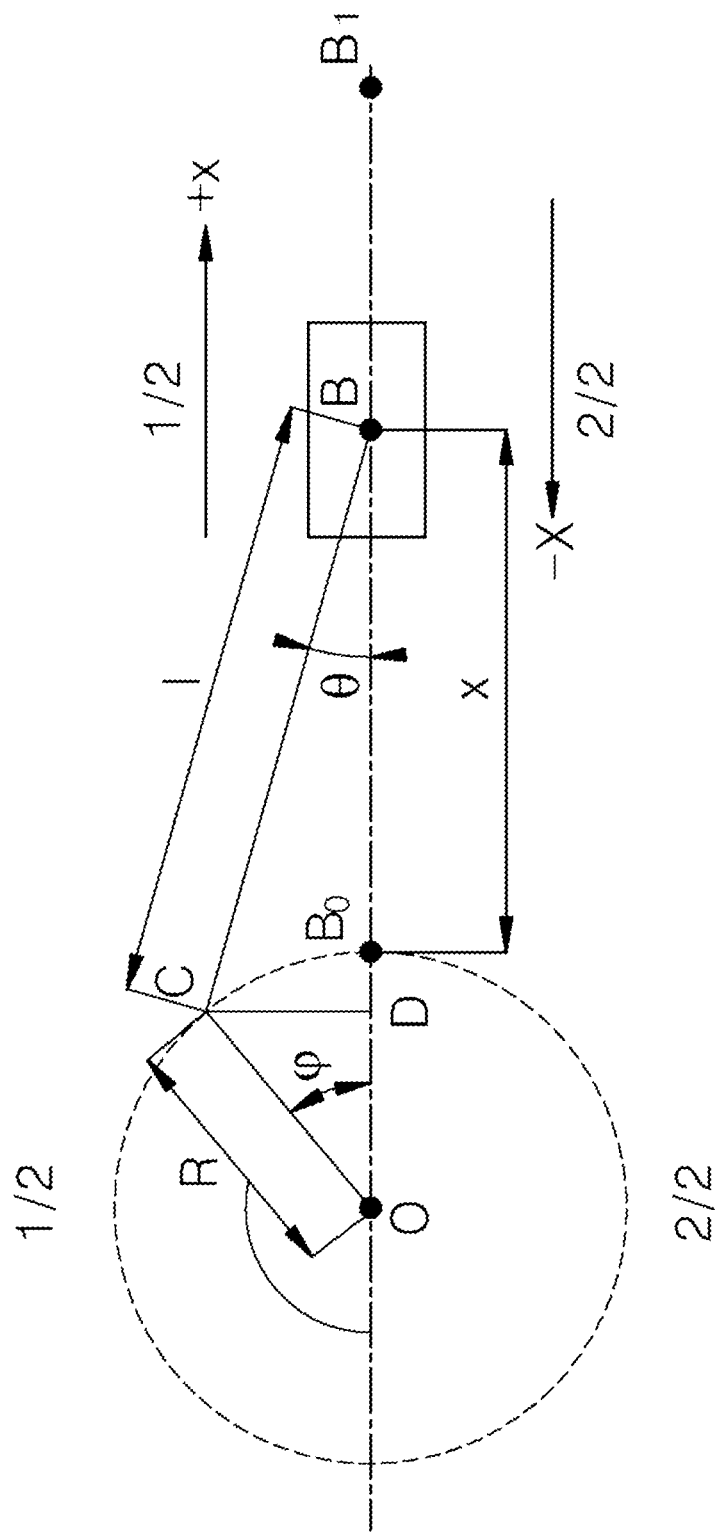
FIG. 4 is a diagram schematically showing a slider-crank mechanism of the driving unit of the photoacoustic probe of FIG. 3.

FIG. 3 schematically shows a linear reciprocating motion of a driving unit of a 2-channel photoacoustic probe of the apparatus 1 in FIG. 3. FIG. 4 schematically shows a slider-crank mechanism of the driving unit of the linear reciprocating motion of the photoacoustic probe in FIG. 3.

Referring to the drawings, the apparatus 1 may convert a one-directional rotational motion of the drive motor into a linear reciprocating motion of a photoacoustic probe 160 by the slider-crank mechanism. To this end, a pair of the photoacoustic probes 160 are installed on a slider 150 to be spaced from each other in the same direction as an extending direction of a rail 140, and the pair of photoacoustic probes 160 are installed to be spaced from each other by the same distance (R) corresponding to twice (2R) a rotation radius (R) of a crank shaft 120 with reference to the slider 150.

In this case, by installing the pair of photoacoustic probes 160 to be spaced from each other by the same distance corresponding to twice (2R) the rotation radius (R) of the crank shaft 120 with reference to the slider 150, it is possible to acquire the largest field of view (FOV) in a case where two or more photoacoustic probes 160 are provided without missing part in the object.

As another embodiment, the pair of the photoacoustic probes 160 may be installed to be spaced from each other by the same distance (R) shorter than twice (2R) the rotation radius (R) of the crank shaft 120 with reference to the slider 150.

In this case, the pair of photoacoustic probes 160 may overlap, and thus, it is possible to stably enlarge the field of view (FOV) without missing part in the object. Particularly, this configuration is useful in a case where the scanning trigger signal is generated at an interval of an integer (2 or greater) multiple of the linear encoder pulse signal.

The slider-crank mechanism 100 may include the driving shaft 110, the crank shaft 120, the connecting rod 130, the rail 140, the slider 150, and the photoacoustic probes 160. In this case, the driving shaft 110 may be a rotation shaft of a motor or may be extended to be connected to the rotation shaft of the motor. The crank shaft 120 is installed to be fixed to the drive shaft and rotates, and the connecting rod 130 may be connected to one end thereof by a rotating joint.

Further, the rail 140 may be fixed to a frame, and the slider 150 may be installed through a linear guide or the like so as to linearly move on the rail 140. In this case, the slider 150 may be connected to an opposite end part to a part of the connecting rod 130 connected to the crank shaft 120 by a rotation joint. The photoacoustic probes 160 may be installed at an end of the slider 150.

Accordingly, a rotational motion of the crank shaft 120 is generated by the rotation of the drive shaft 110, and a linear translational motion of the photoacoustic probes 160 fixed to the slider 150 may be generated by the rotational motion of the crank shaft 120.

On the other hand, a counter balance 105 may be connected to the other end part of the crank shaft 120. Accordingly, it is possible to stably perform the rotation of the crank shaft 120, thereby reduce vibration during the high-speed translational motion of the photoacoustic probe 160 to achieve a stable translational motion.

In FIG. 4, a central point O may be a fixed link, and a point B may be a slider link. In terms of a mechanical configuration, the fixed link corresponds to a drive motor that performs a rotational motion, and the slider link corresponds to a scanning probe that performs a linear reciprocating motion. In FIG. 4, O-C represents a crank link, and C-B represents a coupler link. In terms of a mechanical configuration, the crank link corresponds to a crank shaft, and the coupler link corresponds to a connecting rod.

One end of the crank shaft is coupled to a shaft of the motor, and the other end thereof is coupled to one end of the connecting rod in a similar manner to a hinge coupling, and the other end of the connecting rod is coupled to the probe in a similar manner to the hinge coupling. In a case where the motor rotates, the crank shaft rotates in the same direction as a rotation direction of the motor, and this rotation drives one end of the connecting rod, and this driving force is transmitted to the other end of the connecting rod in a longitudinal direction of the connecting rod to cause the linear reciprocating motion (movement in the +X direction and −X direction) of the probe. This mechanism is similar to a motion mechanism of a crank shaft and a piston applied to a four-stroke engine, which is a kind of internal combustion engine. Further, in order to ensure stability of the linear reciprocating motion, a linear guide is usually provided on the slider link (probe side).

On the other hand, on the motor side and the probe side, there may be provided encoders that measure physical quantities related to each motion, such as a current position, a motion speed, a rotation speed, and a rotation angle. On the motor side, since the motor performs the rotation motion, a rotary encoder may be provided for easy measurement of physical quantities (rotational motion speed, rotation angle, or the like) related to the rotational motion, and on the probe side, since the probe performs the linear translational motion, a linear encoder may be provided for easy measurement of physical quantities (translational motion speed, translational motion distance, probe position, or the like) related to the linear motion.

These encoders provide the measured physical quantities in the form of electrical signals to a controller that controls the operations of the motor or probe, and the controller performs the operation controls on the basis of the received physical quantities. Here, the "motor side or probe side" is an expression to cover a case where the encoder is built in the motor or probe and a case where it is not, which includes a case where the encoder is actually built in the motor or probe and a case where the encoder is provided outside thereof.

A process of scanning an object using the slider-crank mechanism will be briefly described with reference to FIG. 6. First, scanning of an N-th line (line #N) of the object is performed in one direction (X-direction) of the translational motion of the probe. In a case where the scanning of the N-th line is finished, the probe is moved in the Y-direction, and then, an (N+1)-th line (line #N+1) is scanned in the reverse direction (−X direction) of the translational motion. That is, alternating scanning is performed on a line-by-line basis, and thus, a so-called zigzag two-dimensional scanning is performed.

Figure 5:
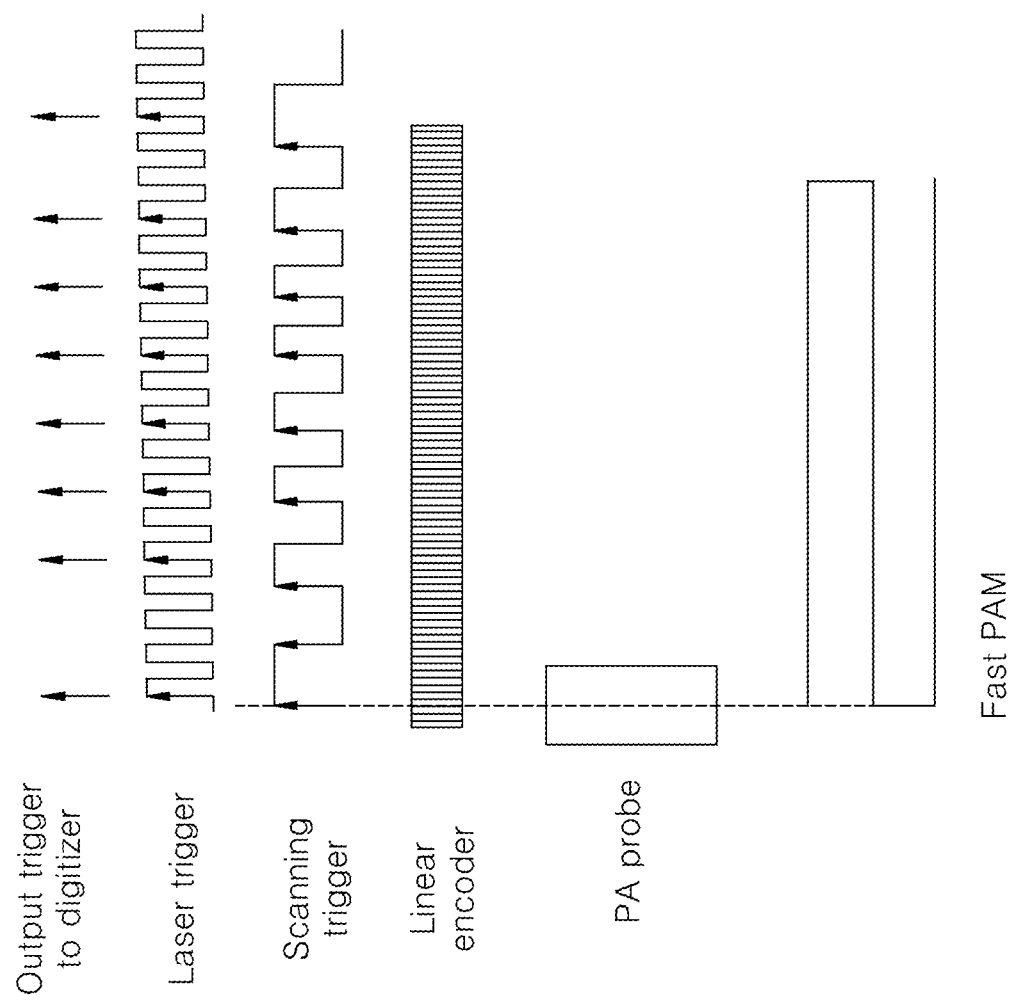
FIG. 5 is a timing diagram schematically showing a method of generating an output trigger signal in the high-speed scanning photoacoustic image acquiring apparatus of FIG. 1.

FIG. 5 shows a signal processing flow in the trigger controller 50.

Referring to FIG. 5, the trigger controller 50 receives a laser detection signal and a rotary encoder pulse signal and/or a linear encoder pulse signal, generates a scanning trigger signal and a laser trigger signal, generates an output trigger signal synchronized with the laser trigger signal, and transmits the result to the analog-to-digital converter 30.

Here, the scanning trigger signal may be generated in synchronization with each rising time with reference to the rotary encoder pulse signal. Further, the laser trigger signal may be generated in synchronization with the laser detection signal generated by detecting the pulse of the laser beam by the photo detector (PD), and may be generated in synchronization with a first rising time after the scanning trigger signal is generated. Accordingly, the laser trigger signal may be generated in correspondence with the scanning trigger signal, and in a case where a position in the encoder is designated by the scanning trigger signal, the laser trigger signal at the designated position is generated. Here, the output trigger signal synchronized with the laser trigger signal may be generated and transmitted to the analog-to-digital converter 30.

As another embodiment, the scanning trigger signal may be generated at an interval of an integer multiple of an interval of the pulse signal of the rotary encoder. Here, the interval of the scanning trigger signal may be determined according to a resolution set from the outside. Thus, it is possible to reduce load on generation and processing of an ultrasonic signal by enabling a smaller output of an ultrasound output signal and a smaller input of an ultrasound image signal.

As another embodiment, by evaluating image quality of an image signal generated in real time and adaptively adjusting the generation interval of the scanning trigger signal, it is possible to obtain an image of optimal quality while reducing the load on the ultrasound signal generation and processing.

On the other hand, the encoder may be classified into an incremental encoder and an absolute encoder according to a method of measuring the above-described physical quantities. The incremental encoder and the absolute encoder have different slit shapes. In the former, each slit has a uniform shape, whereas in the latter, each slit has a different and unique shape. This difference in the shape of the slit results in a difference of necessity of a reference point (origin) in measurement of the above-mentioned physical quantities. That is, in the former case, the reference point is required, whereas in the latter, the reference point is not required. In the former case, in a case where a certain problematic situation (unpredictable cut-off of power, unpredictable interruption of motion, or the like) occurs, all information about physical quantities provided to a motion controller of a motor or a probe is lost (returns to the reference point), it is necessary to perform the measurement of all physical quantities again from the beginning, which becomes a disadvantage. On the other hand, since the latter case does not require the reference point, there is no such concern even in a case where a problematic situation occurs, unlike the former case. In a case where the problematic situation is solved, it is possible to restart measurement of all physical quantities immediately after the problematic situation occurs. That is, the continuity of the measurement of all physical quantities can be ensured.

However, in the latter case, it takes a very long time to manufacture the slit due to the above-described characteristic of the slit shape, and the design of a related motor operation control mechanism becomes very complicated or difficult, so that it takes a lot of effort and time to implement the control mechanism. This eventually causes an increase in cost required to obtain a final result such as a product, and since the cost is significantly higher than that in the case of using the former under the same conditions, the former case is used much more than the latter case in spite of the above-mentioned disadvantages in most industrial fields.

However, in the former case, it is difficult to utilize the encoder due to the above-mentioned disadvantages in fields where precise or continuous control of the operations of the motor and the device (probe) is necessary. Since it is not easy to secure stability (stable implementation) of the reference point due to several reasons, there is a problem in reliability of generated information (information to be obtained) about the object. That is, there is a problem that the accuracy of the generated information may be lacking. A so-called Z-phase pulse signal is generated from the former reference point, which is a signal generated every time the motor rotates. The signal serves as a reference signal (reference point) for measurement of the above-described physical quantities. However, as mentioned above, since it is not easy to stably implement the reference point, it causes incompleteness in the operation control of the motor and the device (probe), and thus, a possibility of lack of accuracy of the generated information exists.

Accordingly, in the present invention, it is possible to solve the problem due to the failure of stable implementation of the reference point in acquiring image information related to an object by using the slider-crank mechanism through compensation based on predetermined signal processing to secure the accuracy (reliability) of generated image information related to the object.

On the other hand, the encoder is necessary to determine, with respect to sequentially input ultrasound image signals that are stored and/or processed, a position on a straight line (X coordinate in FIG. 6) of the photoacoustic probe 15 to which each signal is input and in this case, an embodiment in which only the rotary encoder is used, an embodiment in which both the rotary encoder and the linear encoder are used (FIG. 8), and an embodiment in which only the linear encoder is used (FIG. 7) may be used, respectively.

In the embodiment in which only the rotary encoder is used, the position on the straight line of the photoacoustic probe 15 may be calculated from a Z-phase input corresponding to an initial position of the rotary encoder and an A-phase or B-phase input corresponding to an incremental position.

In the embodiment in which both the rotary encoder and the linear encoder are used (FIG. 8), the position on the straight line of the photoacoustic probe 15 may be calculated by the Z-phase input corresponding to the initial position of the rotary encoder and an incremental position of the linear encoder.

In the embodiment in which only the linear encoder is used, the position on the straight line of the photoacoustic probe 15 may be calculated by an initial input corresponding to the initial position of the linear encoder and the incremental position of the linear encoder.

As an embodiment, the motion information of the photoacoustic probe may be rotational motion information of the rotary encoder that detects the rotational motion of the drive motor, and the rotary encoder may be the incremental rotary encoder that outputs an A-phase signal, a B-phase signal, and a Z-phase signal.

Referring to FIGS. 2 and 5, in the trigger controller 50, in a case where the scanning trigger is generated on the basis of the rotational position information by the A-phase signal of the incremental rotary encoder that detects the rotational motion of the drive motor, the linear motion position of the photoacoustic probe 15 may be calculated at the time when each output trigger signal is generated, and an ultrasound image signal at the calculated linear motion position may be stored in correspondence to each output trigger signal.

Here, in a case where the incremental encoder is used, it may not be easy to secure the stability of the reference point (stable implementation). In other words, in forming a slit (reference point) from which a Z-phase pulse signal is output in a manufacturing process of the incremental rotary encoder, the slit may be formed at a non-intended position due to a problem in the process, or deformation occurs in the slit due to a problem in storage of the rotary encoder or the influence of temperature and humidity, so that the position of the already formed slit may become incorrect. In a case where the position of the slit becomes incorrect as described above, it is difficult to accurately detect a rotation angle or the number of rotations of a motor. That is, in a case where the position of the slit provided to represent a specific rotation angle becomes incorrect, the rotation angle actually indicated by the slit will be different from an intended specific angle. Here, since the rotary encoder recognizes that the rotation angle is equal to the intended specific rotation angle for the specific slit, a difference between the actual angle of the specific slit and a predicted angle thereof occurs. Due to the difference, a problem occurs in that the measurement result of the rotation angle or the number of rotations of the motor is not reliable. In addition, the generation of the Z-phase pulse signal may become unstable due to mechanical vibrations that may occur during the movement of the motor and the probe.

The above-mentioned problem causes inaccuracies in image information generated by using the slider-crank mechanism. That is, since the reference point becomes unstable, the reference signal for motion controls of the motor and the device (probe) becomes unstable, which causes distortion of image signals and distortion of generated image information such as noise. The present invention introduces a virtual Z-phase pulse signal (virtual Z) as a method for solving the above-mentioned problems to ensure the accuracy of generated image information.

In this case, in the embodiment in which both the rotary encoder and the linear encoder are used (FIG. 8), in a case where the one-directional rotational motion of the drive motor is started, the trigger controller 50 generates a first trigger event signal after the A-phase signals of a preset number of pulses is input after the Z-phase signal of the rotary encoder is generated, and in a case where the first trigger event signal is generated, the scanning trigger signal is generated in the form of pulses up to a preset position of the photoacoustic probe using the pulse signal of the linear encoder as a synchronization signal.

Further, the trigger controller 50 generates a second trigger event signal in correspondence to a preset position of the photoacoustic probe after the generation of the scanning trigger signal is stopped, and in a case where the second trigger event signal is generated, the scanning trigger signal is generated in the form of pulses up to a preset position of the photoacoustic probe using the pulse signal of the linear encoder as a synchronization signal.

In another embodiment in which only the linear encoder is used (FIG. 7), in a case where the one-directional rotational motion of the drive motor is started, the trigger controller 50 may generate a first trigger event signal after the A-phase signals of a preset number of pulses is input after the initial reference signal of the rotary encoder is generated.

The scanning trigger signal may be generated on the basis of a linear motion position of the probe calculated by a pulse signal generated by the linear encoder that detects the linear motion of the probe, and each photoacoustic signal at the linear motion position of the probe may be stored in correspondence to each output trigger signal.

In another embodiment in which only the rotary encoder is used, the scanning trigger signal may be generated in the form of pulses up to a preset position of the photoacoustic probe using the pulse signal of the rotary encoder as a synchronization signal after the first trigger event signal is generated.

The trigger controller 50 may generate a reception trigger signal of the ultrasound image on the basis of the motion information of the photoacoustic probe 15. In this case, the trigger controller 50 may generate a scanning trigger signal on the basis of rotational position information by an A-phase signal of the incremental rotary encoder that detects the rotational motion of the drive motor, and a linear motion position of the photoacoustic probe may be calculated when each scanning trigger signal is generated.

On the other hand, the trigger controller 50 may generate the scanning trigger signal on the basis of a linear motion position of the probe calculated by a linear encoder pulse signal generated by the linear encoder that detects the linear motion of the photoacoustic probe. That is, the trigger controller 50 may generate the scanning trigger signal only on the basis of the linear motion position of the probe 10 detected by the pulse signal generated by the linear encoder, without the rotary encoder.

On the other hand, the trigger controller 50 may generate the scanning trigger signal by simultaneously using the rotational motion information of the rotary encoder that detects the rotational motion of the drive motor and the linear motion information of the linear encoder that detects the linear motion of the probe. In this case, the rotary encoder is an incremental rotary encoder that outputs an A-phase signal, a B-phase signal, and a Z-phase signal in the form of pulses, respectively, and the linear encoder outputs a linear pulse signal at regular intervals in the form of pulses according to the position on the linear motion trajectory of the probe.

Further, it is desirable to constantly make the interval of the scanning trigger signal the same as the interval of the pulse signal of the linear encoder (because it is possible to obtain as much information as possible on the state of the object included in the ultrasound signal, it is possible to generate higher resolution image information). However, in this case, there is a concern that excessive time is necessary for processing of the acquired state information and the load of the photoacoustic image information generation process for the object is increased. This may cause inaccuracy of the generated image information (because an error may occur in various processing processes for image information generation according to the increase in load), which may rather lower the significance of the present invention. Accordingly, it is necessary to properly set the amount of acquisition of necessary state information in consideration of various factors such as the type and state of the object, which depends on a wavelength of the generated trigger signal (an output step of the trigger signal). For example, in a case where the interval (resolution) of the pulse signal of the linear encoder is 20 [μm], the trigger controller 50 may set the interval of a trigger signal to be generated to 40 [μm], 60 [μm], 80 [μm], and so on to generate the trigger signal.

On the other hand, after the first trigger event signal is generated and the trigger signal is generated in the form of pulses up to the preset position of the probe using the pulse signal of the linear encoder as a synchronization signal, the generation of the trigger signal is stopped (accordingly, the reception of the ultrasound signal is stopped, and the acquisition of the state information of the object corresponding to the N-th scanning line is terminated), and a second trigger event signal is generated in correspondence to a preset position of the probe 15 to acquire state information of the object corresponding to the (N+1)-th scanning line. In a case where the second trigger event signal is generated, the trigger signal is generated in the form of pulses up to the preset position of the probe using the pulse signal of the linear encoder as a synchronization signal.

In the above description, the first trigger event signal and the second trigger event signal correspond to the virtual Z-phase pulse signal (virtual Z), and the acquisition of state information is not started by the generation of the actual Z-phase pulse signal (physical Z), but is started by the generation of these two event signals. In other words, in the present invention, only a notification role of the "starting of scanning operation" is given to the actual Z-phase pulse signal, and a notification role of the "starting of state information acquisition" is given to these two event signals. Here, since the term "virtual" means that two event signals perform some of the roles to be performed by the actual Z-phase pulse signal as described above, and thus, function "like" the actual Z-phase pulse signal.

In a case where the "starting of scanning operation" and the "starting of state information acquisition" are simultaneously (without time difference) performed by the generation of the actual Z-phase pulse signal, as described above, since stable implementation of the actual Z-phase pulse signal is not guaranteed, the acquisition of the state information inevitably causes instability or inaccuracy. Thus, it can be said that these two event signals function to correct such a problem. By the generation of these two event signals, the state information is acquired only for a partial section (a thick line in FIG. 2) rather than the entire section of each scanning line.

According to the present invention, as can be understood from the above description and FIG. 3, the event signal (trigger event signal) for the starting of state information acquisition is generated "for each scanning line", but the actual Z-phase pulse signal is generated only once per two scanning lines. This is to ensure certainty of the state information acquisition for each scanning line. That is, since the actual Z-phase pulse signal is generated only once per two scanning lines in terms of a characteristic of motion by the slider-crank mechanism, as described above, there is a possibility that the actual Z-phase pulse signal becomes unstable, and thus, it may become unclear which scanning line the acquired state information corresponds to. Accordingly, in order to prevent the unclearness, a trigger event signal for "starting of state information acquisition" is generated for each scanning line, in the present invention.

FIG. 5 is a timing diagram showing a method of generating an output trigger signal in the apparatus 1. Hereinafter, an embodiment in which a scanning trigger signal is generated by a linear encoder pulse signal will be mainly described with reference to FIGS. 2 and 5.

The trigger controller 50 detects generation of a pulse signal corresponding to the initial position of the linear encoder, and starts counting the number of input pulse signals of the linear encoder (Counting start). Here, in a case where the number of pulse signals of the linear encoder reaches a preset value (Counting Num: Z1), the trigger controller 50 generates a first trigger event signal. After the first trigger event signal is generated, the trigger controller 50 generates a scanning trigger signal (Scanning trigger) at an interval of an integer multiple of the preset number of input pulses of the linear encoder.

Further, the trigger controller 50 generates a laser trigger signal (Laser trigger) in synchronization with a rising time of a laser detection signal that follows the scanning trigger signal (Scanning trigger). Further, the trigger controller 50 generates an output trigger signal (Output trigger signal) in synchronization with the laser trigger signal (Laser trigger) and transmits the result to the analog-to-digital converter 30.

Here, in a case where the number of scanning trigger signals (Scanning trigger) reaches a preset value, the generation of the scanning trigger signals is stopped. As another embodiment, the scanning trigger signal (Scanning trigger) may be continuously generated, and the generation of the laser trigger signal (Laser trigger) and the output trigger signal (Output trigger) may be stopped.

Thus, 1/2 rotation of the drive motor is completed in the embodiment shown in FIG. 6, and the scanning of the N-th scanning line is completed. Here, the probe moves by a preset distance in the Y direction in FIG. 6 before the start of scanning of the next (N+1)-th scanning line. To this end, a scanning module including the photoacoustic probe 15 may be installed in a moving module such as a gantry movable in the Y direction.

In a case where the number of input pulses of the linear encoder reaches a preset value, the trigger controller 50 generates a second trigger event signal. As another embodiment, in a case where the number of pulses of the scanning trigger signal (Scanning trigger) reaches a preset value, the trigger controller 50 may generate the second trigger event signal.

After the second trigger event signal is generated, the trigger controller 50 generates a scanning trigger signal (Scanning trigger) at an interval of an integer multiple of an interval of a preset number of input pulses of the linear encoder. Further, the trigger controller 50 generates a laser trigger signal (Laser trigger) in synchronization with a rising time of a laser detection signal pulse that follows the scanning trigger signal (Scanning trigger). In addition, the trigger controller 50 generates an output trigger signal (Output trigger signal) in synchronization with the laser trigger signal (Laser trigger), and transmits the result to the analog-to-digital converter 30.

Here, in a case where the number of scanning trigger signals reaches a preset number, the generation of the scanning trigger signal (Scanning trigger) is stopped. As another embodiment, the scanning trigger signal (Scanning trigger) may be continuously generated, and the generation of the laser trigger signal (Laser trigger) and the output trigger signal (Output trigger) may be stopped.

Thus, 2/2 rotation of the drive motor is completed in the embodiment shown in FIG. 6, and the scanning of the (N+1)-th scanning line is completed.

On the other hand, a control method according to an embodiment of the present invention is for controlling the apparatus 1 of FIGS. 1 to 8, and may be the same as the control method described above.

The control method according to the present embodiment includes: a step pf splitting one pulse laser beam output from one laser generating section into a first laser beam and a second laser beam; a step pf splitting the second laser beam into a third laser beam and a fourth laser beam; a step pf generating a laser detection signal pulse from the fourth laser beam; a step pf directing each of the first laser beam and the third laser beam to first and second photoacoustic probes that are different from each other; a step pf receiving a first ultrasound signal from the first photoacoustic probe; a step pf receiving a second ultrasound signal from the second photoacoustic probe; a step pf generating an output trigger signal from a laser monitoring signal pulse and linear encoder pulse signals that are motion information of the first and second photoacoustic probes; and a step pf generating a 3D image of an object from the output trigger signal and the first and second ultrasound signals.

The first laser beam splitter VBS1 and the second laser beam splitter VBS2 are variable beam splitters, respectively, and the first laser beam and the third laser beam have the same size which is much larger than that of the fourth laser beam. In this case, the fourth laser beam is not used to acquire a photoacoustic image, but is used to detect output of a laser signal, and is sufficient as long as it is detectable by the photo detector (PD).

As an example, the ratio of the sizes of the first laser beam, the third laser beam, and the fourth laser beam may be 4:4:2.

Figure 7:
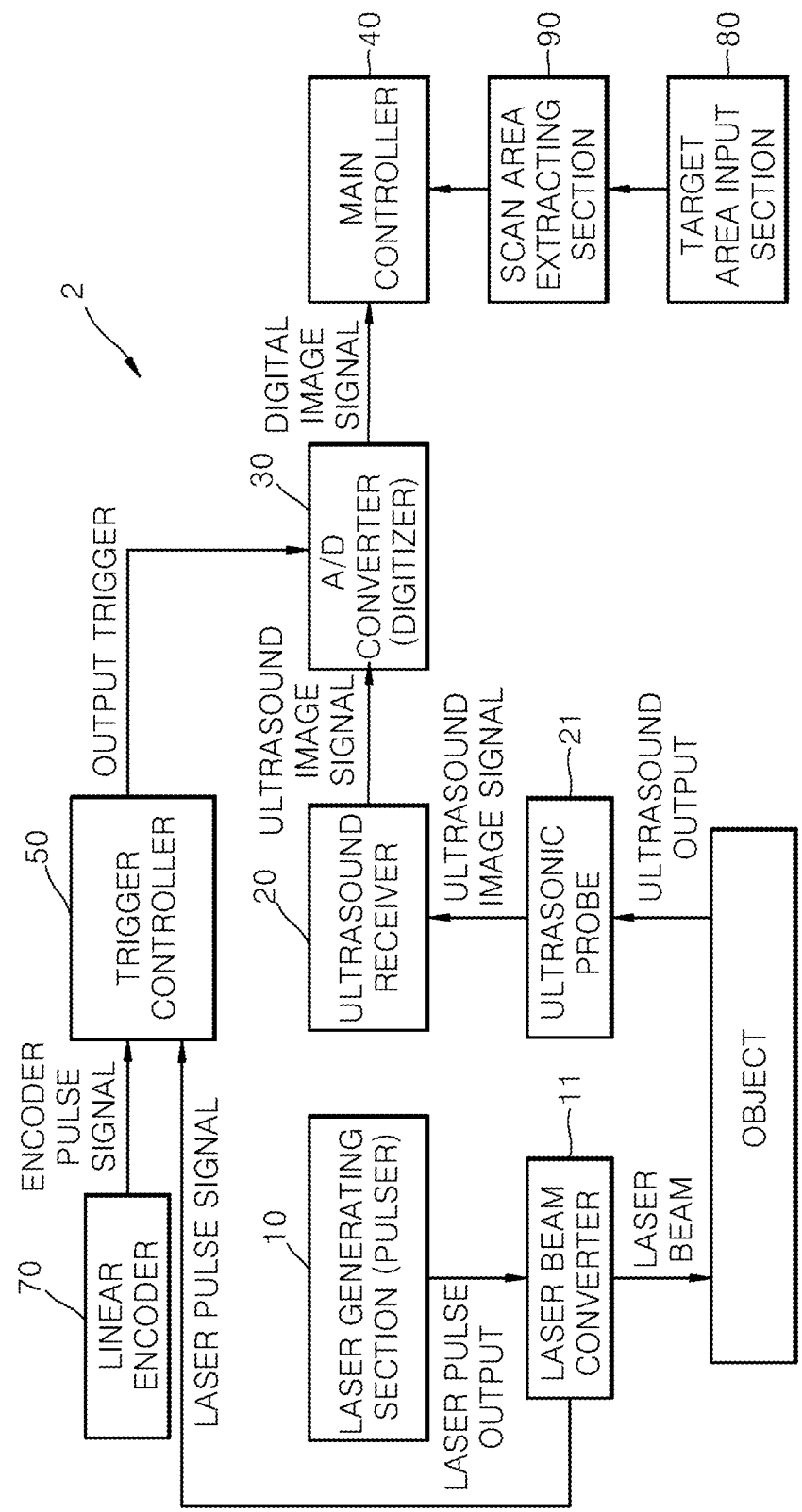
FIG. 7 is a block diagram schematically showing a high-speed scanning photoacoustic image acquiring apparatus according to another embodiment of the present invention.
Figure 8:
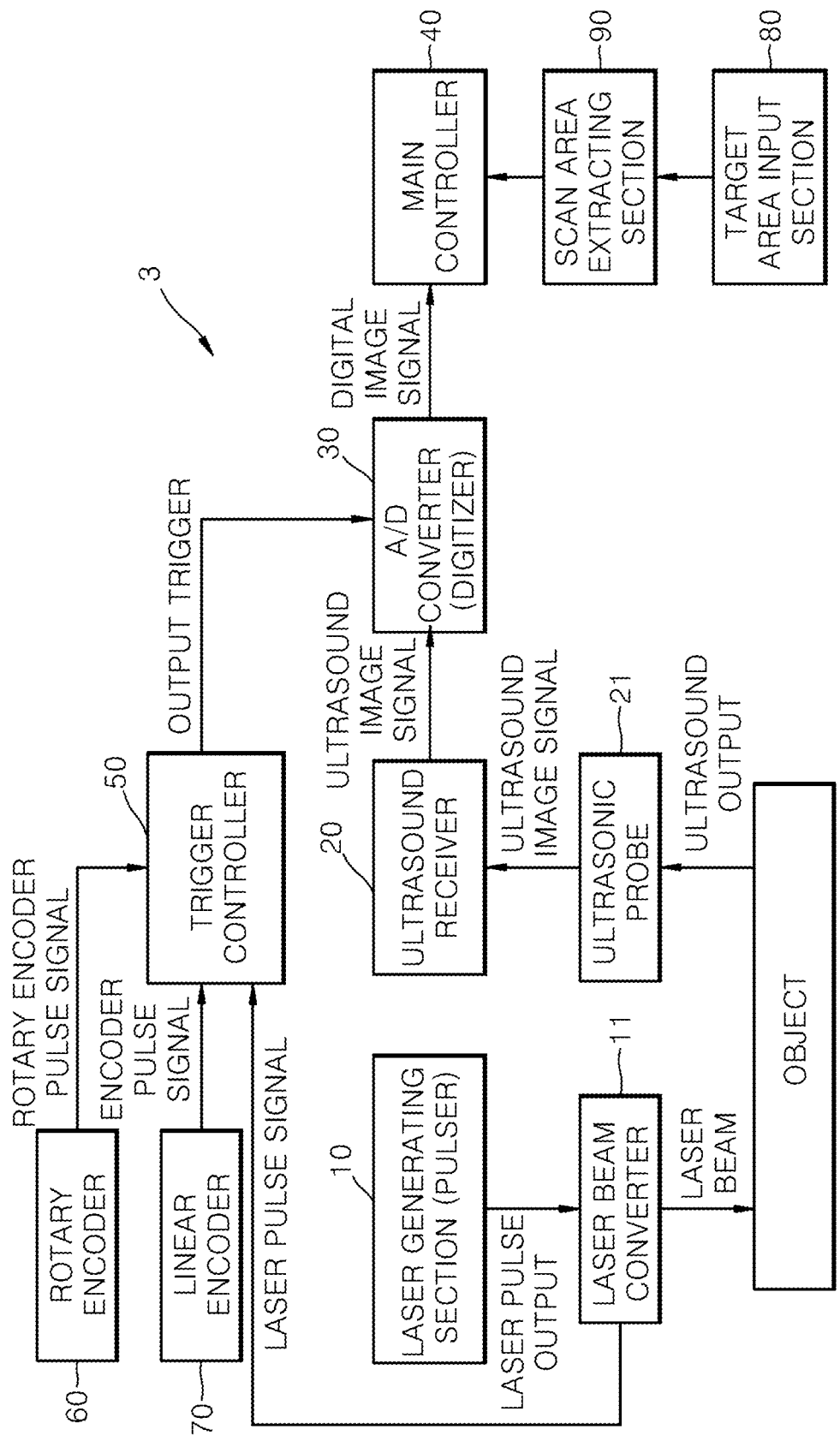
FIG. 8 is a block diagram schematically showing a high-speed scanning photoacoustic image acquiring apparatus according to still another embodiment of the present invention.

FIGS. 7 and 8 show high-speed scanning photoacoustic image acquiring apparatuses 2 and 3 according to other embodiments of the present invention.

Referring to the drawings, the high-speed scanning photoacoustic image acquiring apparatuses 2 and 3 include a target area input section 80 and a scan area extracting section 90, so that a photoacoustic image can be input only for a necessary part of a target area including an object to be examined, instead of the entire scan area.

The target area input section 80 performs input of an image of the target area including the object. The scan area extracting section 90 extracts a scan area determined by position values corresponding to a starting point and an end point of an area in which a photoacoustic image of the object is acquired from the image of the target area.

To this end, the target area input section 80 may include a separate optical camera capable of imaging the target area. The scan area extracting section 90 may recognize and extract the object from the image of the target area. Further, the scan area extracting section 90 may extract an area including the extracted object and a set margin area as a scan area for obtaining a photoacoustic image.

That is, the input of the input image of the target area may be performed using the target area input section 80 such as a separate optical camera, and the scan area extracting section 90 may recognize the object to be imaged from the input image, may extract only the imaged part of the object, and may set the extracted part as a scan area. In this case, the input of the image may be performed in the unit of each scan line only for the scan area. Accordingly, it is possible to output a laser pulse at a set interval and/or to generate an ultrasound image signal only in a preset area, and thus, it is possible to perform input of a photoacoustic image while minimizing the load on the photoacoustic transmitter/receiver, the digital converter, and the main controller (image generating section).

To this end, a scanner including the photoacoustic probe 15 may be installed on a moving module such as a gantry movable in the X-Y direction or the X-Y-Z direction in FIG. 6.

As another embodiment, the target area input section 80 and the scan area extracting section 90 may move a scanning module to a position such that a scanning start point determined according to a position of an object becomes a position determined by a set algorithm, in the entire area.

As another embodiment, the target area input section 80 may include a 3D camera such as a time of flight (TOF) camera, and the scan area extracting section 90 may move a scanner to a position such that a scanning start point determined according to a position of an object becomes a position determined by a set algorithm, in the entire area. Here, the position of the scanning start point may be X-Y-Z 3D coordinate values moved by the moving module.

In this case, the scanning of the object is not performed over the entire region (AR) in which the scanner can be positioned, but is performed over a partial area (PR) in which the acquisition of the state information of the object is necessary, thereby preventing unnecessary data that may be generated in the process of acquiring the state information. To this end, in the present invention, prior to the scanning and the acquisition of the state information on the object, the size of the area (PR) in which the acquisition of the state information is necessary from a captured image is determined after imaging of the object is performed, and the acquisition of the state information (the scanning of the object) is performed only for the area (PR) corresponding to the size.

The laser beam converter 11 includes the beam splitters (VBS1 and VBS2) and the photo detector (PD), generates a laser detection signal pulse according to a laser pulse of the fourth laser beam detected by the photo detector (PD), and converts a received ultrasound signal into an image signal using the laser detection signal pulse as a trigger, and the image generating section receives the converted image signal and generates a photoacoustic image of the object. Here, since the ultrasound signal includes the state information of the object, the state information of the object is generated as a photoacoustic image.

The high-speed scanning photoacoustic image acquiring apparatus according to the present invention may be used for medical diagnosis that requires, particularly, a visible and immediate confirmation of the inside of a living body, and for example, may be used for diagnosis of a diabetic foot.

The diabetic foot (DM Foot Ulcer) is a generic term for neuropathy, structural deformation, skin callus, skin and nail changes, foot ulcers, infections, and vascular diseases expressed in the feet of diabetic patients. As the diabetic foot progresses, even small wounds do not heal and become ulcers, which causes the feet to turn black due to poor blood circulation.

For the diagnosis of the diabetic foot, it is necessary to image the inside of the patient's foot in advance, but it is not easy to accurately visualize blood vessels by existing X-ray, CT, MRI, or the like that are utilized as techniques of generating image information inside the living body described above, and time required for visualization is long. Accordingly, it is difficult to diagnose whether the disease has progressed or not and the degree of progress, and thus, the diagnosis of the diabetic foot through the above techniques is not reliable at it is close to an analogy based on clinical experiences of a doctor through checking and analyzing the presence or absence of diabetes and current physical conditions.

However, by applying the present invention to the diabetes diagnosis, it is possible to generate an image inside the foot with high speed and high resolution by combining a high-speed scanning apparatus and a photoacoustic microscopy. Accordingly, it is possible to diagnose the diagnostic foot by improving a slow scanning speed of existing photoacoustic microscopy systems, and thus, it is possible to quickly complete the diagnosis of the diabetic foot by imaging blood vessels of the patient's foot within 60 seconds while a doctor is treating a patient sitting face to face using non-invasive ultrasound and light (laser) in a harmless range.

As described above, the technical concept of the present invention has been proposed through the disclosure of preferred embodiments of the present invention that guarantee the specificity of the concept. Those of ordinary skill in the art to which the present invention pertains will understand that the preferred embodiments may be modified in various forms without departing from the technical spirit (essential characteristics) of the present invention. Accordingly, the disclosed embodiments should be considered from an illustrative point of view rather than a limiting point of view, and the scope of the present invention should be construed to include not only the matters disclosed in claims, but also all equivalents thereof.

What is claimed is:

1. An apparatus for acquiring a photoacoustic image by high-speed scanning, that converts a one-directional rotational motion of a drive motor into a linear reciprocating motion of a photoacoustic probe connected to the drive motor and generates an image of an object by scanning the object in two dimensions by the linear motion of the photoacoustic probe and a vertical motion perpendicular to the linear motion, comprising:
   a photoacoustic transmitter/receiver that outputs a laser pulse toward the object using a laser generating section and receives an ultrasound image signal from the object using an ultrasound receiver;
   an analog-to-digital converter that receives the ultrasound image signal and converts the ultrasound image signal into a digital image signal;
   a main controller that receives the digital image signal and generates ultrasound image information on the object; and
   a trigger controller that receives motion information of the photoacoustic probe, generates a scanning trigger signal corresponding to the motion information, receives information of the laser pulse output, generates a laser trigger signal corresponding to the laser pulse output, generates an output trigger signal corresponding to the laser trigger signal, and outputs the generated output trigger signal to the analog-to-digital converter,
   wherein the main controller sequentially synthesizes images corresponding to the ultrasound image signals corresponding to the output trigger signals in the unit of a scan line to generate an image of the object.

2. The apparatus according to claim 1, wherein the analog-to-digital converter converts the ultrasound image signal corresponding to the output trigger signal in the ultrasound image signal input from the ultrasound receiver into a digital image signal and transmits the digital image signal to the main controller.

3. The apparatus according to claim 1, wherein the main controller sequentially synthesizes the input digital image signals in the unit of a scan line to generate a line image, and synthesizes the line images in the respective scan lines to generate a 3D image.

4. The apparatus according to claim 3, wherein even-numbered line images are synthesized in a reverse order to generate an even-numbered image, and the even-numbered image is synthesized with an odd-numbered image to generate a 3D image.

5. The apparatus according to claim 1, wherein the one-directional rotational motion of the drive motor is converted into the linear reciprocating motion of the photoacoustic probe by a slider-crank mechanism,
   a pair of the photoacoustic probes are installed on a slider to be spaced from each other in the same direction as a rail extending direction, and
   the pair of photoacoustic probes are installed to be spaced from each other by the same distance corresponding to twice a rotation radius of a crank shaft with reference to the slider.

6. The apparatus according to claim 1, wherein the one-directional rotational motion of the drive motor is converted into the linear reciprocating motion of the photoacoustic probe by a slider-crank mechanism,
   a pair of the photoacoustic probes are installed in a slider to be spaced from each other in the same direction as a rail extending direction, and
   the pair of photoacoustic probes are installed to be spaced from each other by the same distance shorter than twice a rotation radius of a crank shaft with reference to the slider.

7. The apparatus according to claim 1, further comprising:
   a beam splitter that splits a laser beam generated in the laser generating section into a first laser beam and a fourth laser beam;
   a photo detector that detects the fourth laser beam and generates a laser detection signal; and
   a coupler that reflects the first laser beam to irradiate the object with the reflected first laser beam, and transmits the ultrasound signal from the object,
   wherein the ultrasound receiver receives the ultrasound image signal that has passed through the coupler.

8. The apparatus according to claim 1, further comprising:
   a first beam splitter that splits a laser beam generated in the laser generating section into a first laser beam and a second laser beam;

a second beam splitter that splits the second laser beam into a third laser beam and a fourth laser beam;
a photo detector that detects the fourth laser beam and generates a laser detection signal;
a first coupler that reflects the first laser beam to irradiate a portion of the object with the reflected first laser beam, and transmits the ultrasound signal from the object; and
a second coupler that reflects the third laser beam to irradiate another portion spaced from the portion of the object by a predetermined distance with the reflected third laser beam, and transmits the ultrasound signal from the object,
wherein the ultrasound receiver receives the ultrasound image signals that have passed through the first and second couplers.

9. The apparatus according to 7,
wherein the coupler includes a coupling surface on which two prisms are coupled, and the coupling surface is coated with an aluminum material to reflect the irradiated laser beam and transmit the ultrasound image signal.

10. The apparatus according to claim 1,
wherein an image generating section of the main controller calculates a position of the photoacoustic probe corresponding to the output trigger signal, and stores the ultrasound image signal at the calculated position in correspondence with each output trigger signal.

11. The apparatus according to claim 1,
wherein the motion information of the photoacoustic probe is rotational motion information of a rotary encoder that detects the rotational motion of the drive motor, and the rotary encoder is an incremental rotary encoder that outputs an A-phase signal, a B-phase signal, and a Z-phase signal.

12. The apparatus according to claim 1,
wherein the scanning trigger signal is generated on the basis of rotational position information by an A-phase signal of an incremental rotary encoder that detects the rotational motion of the drive motor,
a linear motion position of the photoacoustic probe is calculated when each output trigger signal is calculated, and
the ultrasound image signal at the calculated linear motion position is stored in correspondence to each output trigger signal.

13. The apparatus according to claim 1,
wherein the scanning trigger signal is generated on the basis of a linear motion position of the probe calculated by a linear encoder pulse signal generated by a linear encoder that detects the linear motion of the photoacoustic probe, and the ultrasound image signal at the linear motion position of the probe is stored in correspondence to each output trigger signal.

14. The apparatus according to claim 1,
wherein the motion information of the photoacoustic probe includes rotational motion information of a rotary encoder that detects the rotational motion of the drive motor and linear motion information of a linear encoder that detects the linear motion of the photoacoustic probe,
the rotary encoder is an incremental rotary encoder that outputs an A-phase signal, a B-phase signal, and a Z-phase signal in the form of pulses, respectively, and
the linear encoder outputs a linear pulse signal at regular intervals in the form of pulses according to a position on a linear motion trajectory of the photoacoustic probe.

15. The apparatus according to claim 14,
wherein in a case where the one-directional rotational motion of the drive motor is started, the trigger controller generates a first trigger event signal after the A-phase signals of a preset number of pulses is input after the Z-phase signal of the rotary encoder is generated, and in a case where the first trigger event signal is generated, the scanning trigger signal is generated in the form of pulses up to a preset position of the photoacoustic probe using the pulse signal of the linear encoder as a synchronization signal.

16. The apparatus according to claim 1,
wherein the scanning trigger signal is generated at an interval of an integer multiple of an interval of the pulse signal of the linear encoder.

17. The apparatus according to claim 16,
wherein the trigger controller generates a second trigger event signal in correspondence to a preset position of the photoacoustic probe after the generation of the scanning trigger signal is stopped, and
in a case where the second trigger event signal is generated, the scanning trigger signal is generated in the form of pulses up to a preset position of the photoacoustic probe using the pulse signal of the linear encoder as a synchronization signal.

18. The apparatus according to claim 1, further comprising:
a target area input section that performs input of an image of a target area including the object; and
a scan area extracting section that extracts a scan area determined by position values corresponding to a starting point and an end point of an area in which a photoacoustic image of the object is acquired from the image of the target area.

* * * * *